United States Patent [19]

Jippo

[11] Patent Number: 5,301,351
[45] Date of Patent: Apr. 5, 1994

[54] DATA TRANSFER CONTROL SYSTEM BETWEEN HIGH SPEED MAIN MEMORY AND INPUT/OUTPUT PROCESSOR WITH A DATA MOVER

[75] Inventor: Akira Jippo, Tokyo, Japan
[73] Assignee: NEC Corporation, Tokyo, Japan
[21] Appl. No.: 3,685
[22] Filed: Jan. 13, 1993

Related U.S. Application Data

[63] Continuation of Ser. No. 442,530, Nov. 28, 1989, abandoned.

[30] Foreign Application Priority Data

Nov. 29, 1988 [JP] Japan ............................... 63-299423

[51] Int. Cl.$^5$ .............................................. G06F 13/00
[52] U.S. Cl. ..................................... 395/800; 395/250; 395/275; 395/425; 364/239.1; 364/239.7; 364/260; 364/DIG. 1
[58] Field of Search ............... 395/500, 800, 250, 275, 395/425

[56] References Cited

U.S. PATENT DOCUMENTS

| | | | |
|---|---|---|---|
| 3,980,993 | 9/1976 | Bredart et al. | 340/172.5 |
| 4,006,466 | 2/1977 | Patterson | 340/172.5 |
| 4,017,839 | 4/1977 | Calle et al. | 340/172.5 |
| 4,228,501 | 10/1980 | Frissell | 395/250 |
| 4,571,674 | 2/1986 | Hartung | 364/200 |
| 4,667,286 | 5/1987 | Young et al. | 395/250 |
| 4,672,613 | 6/1987 | Foxworthy et al. | 395/250 |
| 4,716,525 | 12/1987 | Gilanyi et al. | 395/250 |
| 4,788,638 | 11/1988 | Ogawa et al. | 364/200 |
| 4,797,809 | 1/1989 | Sato et al. | 364/200 |
| 4,811,280 | 3/1989 | Berkowitz et al. | 364/900 |
| 4,855,900 | 8/1989 | Simpson et al. | 395/425 |
| 4,860,193 | 8/1989 | Bentley et al. | 395/250 |
| 4,956,808 | 9/1990 | Aakre et al. | 395/250 |
| 5,121,479 | 6/1992 | O'Brien | 395/250 |

FOREIGN PATENT DOCUMENTS 2037039 11/1979 United Kingdom.

OTHER PUBLICATIONS

IBM Technical Disclosure Bulletin, vol. 29, No. 4, Sep. 1986 pp. 1829-1833 "Data rate maching buffer".

*Primary Examiner*—Alyssa H. Bowler
*Assistant Examiner*—Alpesh M. Shah
*Attorney, Agent, or Firm*—Foley & Lardner

[57] ABSTRACT

In a data processing method of this invention, data having an amount of a designated total data transfer length is transferred from a data buffer in a data mover to a designated start address of a control memory at a data transfer rate of a control data transfer control unit. Data having an amount of a designated block data transfer length is transferred from the buffer in the data mover to a designated start address of a high-speed arithmetic memory at a data transfer rate of a high-speed data transfer control unit.

3 Claims, 6 Drawing Sheets

FIG.2

| | |
|---|---|
| TRANSFER TARGET | CONTROL MEMORY ⟶ HIGH-SPEED ARITHMETIC MEMORY |
| OUTPUT FORMAT | CONTROL PROCESSOR/ INPUT/OUTPUT PROCESSOR ⟶ DATA MOVER |
| CONTROL MEMORY ADDRESS | 8-n BYTE BOUNDARY LOGICAL/PHYSICAL ADDRESS |
| HIGH-SPEED ARITHMETIC MEMORY ADDRESS | 8-n BYTE BOUNDARY LOGICAL/PHYSICAL ADDRESS |
| TOTAL DATA TRANSFER LENGTH | THE NUMBER OF ELEMENTS IN UNITS OF 8BYTES |

FIG.5

| | |
|---|---|
| TRANSFER TARGET | CONTROL MEMORY ↔ HIGH-SPEED ARITHMETIC MEMORY |
| OUTPUT FORMAT | CONTROL PROCESSOR / INPUT/OUTPUT PROCESSOR → DATA MOVER |
| CONTROL MEMORY ADDRESS | 4nBYTE BOUNDARY LOGICAL/PHYSICAL ADDRESS |
| HIGH-SPEED ARITHMETIC MEMORY ADDRESS | 4nBYTE BOUNDARY LOGICAL/PHYSICAL ADDRESS |
| TOTAL DATA TRANSFER LENGTH | THE NUMBER OF ELEMENTS IN UNITS OF 4 BYTES |
| INTERELEMENT DISTANCE | DESIGNATE IN UNITS OF BYTE |
| BLOCK DATA TRANSFER LENGTH | THE NUMBER OF ELEMENTS IN UNITS OF 4 BYTES |

DATA TRANSFER CONTROL SYSTEM BETWEEN HIGH SPEED MAIN MEMORY AND INPUT/OUTPUT PROCESSOR WITH A DATA MOVER

This application is a continuation of application Ser. No. 07/442,530, filed Nov. 28, 1989, abandoned.

BACKGROUND OF THE INVENTION

The present invention relates to a method of controlling data transfer between a high-speed arithmetic memory used by a high-speed arithmetic processor and an input/output device.

In general, a supercomputer has a capability for performing arithmetic processing at very high speed as compared with general purpose computers. The supercomputers allow high-speed solutions of various equations which represent natural phenomena using a large amount of data to achieve various technical studies and developments in scientific and technological fields.

For example, in an aircraft manufacturer, a supercomputer is used to analyze an air whirl formed around each wing. This analysis has been conventionally performed by experiments using a wind tunnel.

In such a supercomputer for performing a large amount of scientific and technological calculations, many problems are involved, and a very large amount of data are required.

A large amount of data, therefore, are stored in a secondary memory device such as a magnetic disk unit, and the data are input/output between the magnetic disk and a high-speed arithmetic memory, as needed, thus performing calculations.

More specifically, the larger a ratio of a transfer period of time between the secondary emory device and the high-speed arithmetic memory is, as compared with a transfer period of time executed between an arithmetic processor and the high-speed arithmetic memory at high speed, the larger an adverse effect to an execution performance of an entire program becomes.

Conventionally, a supercomputer of this type includes a system control unit, an input/output processor connected to the system control unit, a control processor, a control memory mainly used for these processors, a high-speed arithmetic processor, and a high-speed arithmetic memory mainly used for the high-speed arithmetic processor.

In a data transfer operation between the secondary memory device and the high-speed arithmetic memory in a conventional data processing apparatus of this type, the control processor serves as a main unit, and the data contents transferred from the input/output processor to the control memory are transferred to the high-speed arithmetic memory, or the contents are directly transferred from the input/output processor to the high-speed arithmetic memory.

In this method, however, a rate of transfer to the high-speed arithmetic memory is undesirably limited by a rate of transfer from the control processor or the input/output processor to the control memory.

In general, the rate of transfer from the control processor or the input/output processor to the control memory is considerably lower than that between the high-speed arithmetic processor and the high-speed arithmetic memory. As a result, a ratio of an input/output period of time between the secondary memory device and the high-speed arithmetic memory is undesirably larger than a transfer period of time between the high-speed arithmetic processor and the high-speed arithmetic memory.

More specifically, in the above-mentioned conventional data processing apparatus, a transfer period of time between the secondary memory device and the high-speed arithmetic memory is undesirably longer than that between the high-speed arithmetic processor and the high-speed arithmetic memory, and an execution period of time of the entire program may also be increased, thus degrading performance of the apparatus.

SUMMARY OF THE INVENTION

The present invention has been made in consideration of the above situation, and has as its principal object to provide a data processing apparatus in which an execution period of time of an entire program is decreased, and performance thereof is improved.

According to the present invention, there is provided a method of performing data processing in a data processing apparatus including a system control unit, a first processor group including processors connected to the system control unit, a second processor group including a high-speed arithmetic processor, a first main memory unit mainly used by the first processor group, a second main memory unit mainly used by the second processor group, and data transfer control means for enabling data transfer between the first and second main memory units which is designated by the processor included in the first processor group, comprising the steps of:

transferring data having an amount of a designated total data transfer length from a data buffer in the data transfer control means to a designated start address of the first main memory unit at a data transfer rate between the first processor group and the first main memory unit; and transferring data having an amount of a designated total data transfer length from a buffer in the data transfer control means to a designated start address of the second main memory unit at a data transfer rate between the second processor group and the second main memory unit.

According to the present invention, there is further provided a method of performing data processing in a data processing apparatus including a system control unit, a first processor group including processors connected to the system control unit, a second processor group including a high-speed arithmetic processor, a first main memory unit mainly used by the first processor group, a second main memory unit mainly used by the second processor group, and data transfer control means for enabling data transfer between the first and second main memory units which is designated by the processor included in the first processor group, comprising the steps of:

transferring data having an amount of a designated total data transfer length from a data buffer in the data transfer control means to a designated start address of the first main memory unit at a data transfer rate between the first processor group and the first main memory unit; and sequentially transferring data having an amount of a designated block data transfer length from a buffer in the data transfer control means to a designated start address of the second main memory unit in accordance with a designated interelement distance, and data having an amount of designated total data transfer length from a buffer in the data transfer control means to a designated start address of the second main memory unit at a data transfer rate between the second processor group and the second main memory unit.

BRIEF DESCRIPTION OF THE DRAWINGS

FIG. 2 is a view showing instruction specifications instructed to a mover in the first embodiment;

FIG. 5 is a view showing instruction specifications instructed to a mover in the second embodiment.

DETAILED DESCRIPTION OF THE PREFERRED EMBODIMENTS

Preferred embodiments of the present invention will be described hereinafter with reference to the accompanying drawings.

First Embodiment

Figure 1:
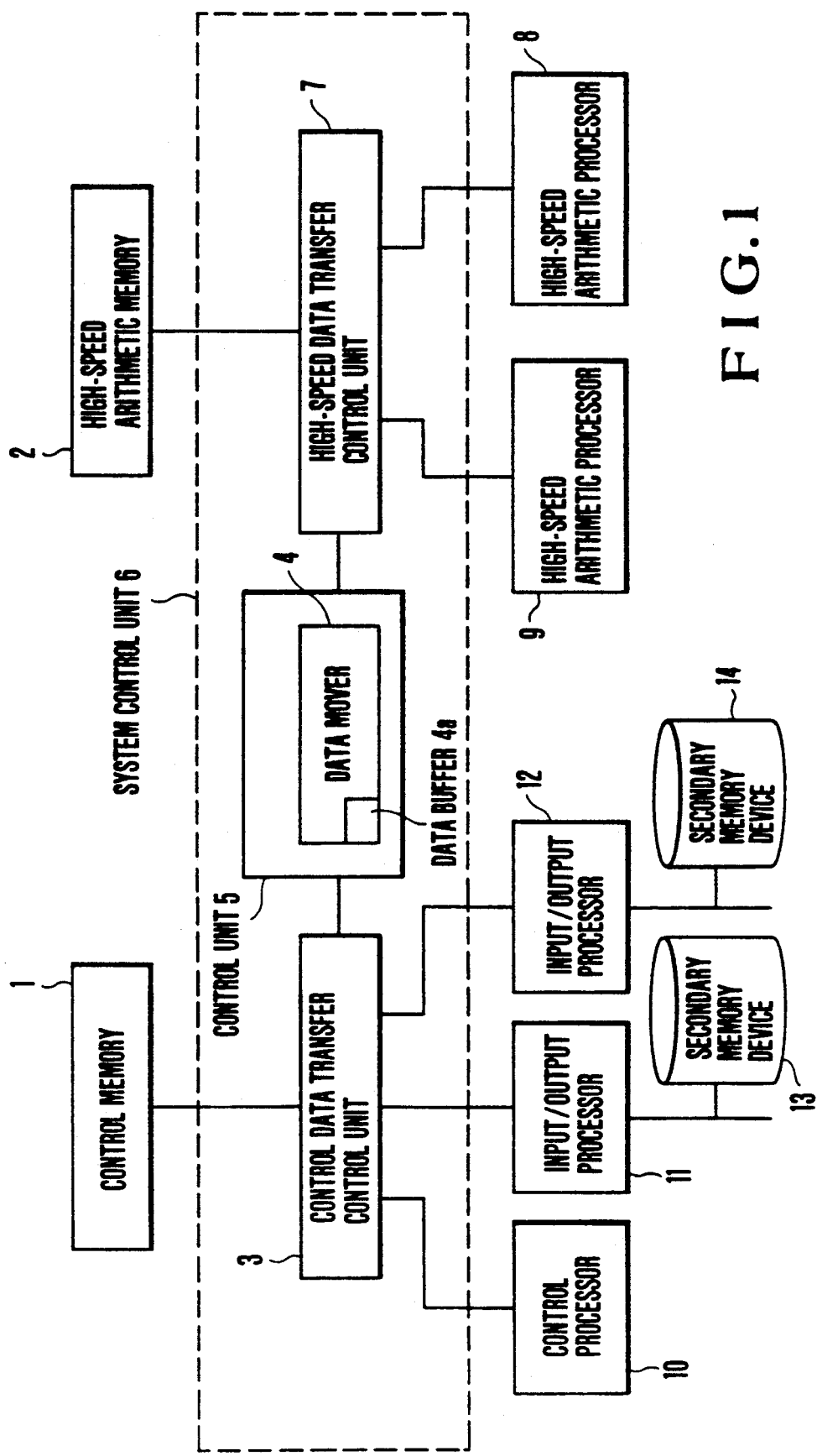
FIG. 1 is a block diagram showing first and second embodiments of the present invention.

Referring to FIG. 1, a data processing apparatus according to the present invention includes a system controller 6, input/output processors 11 and 12 for controlling an input/output operation of a system connected to the system controller 6, secondary memory devices 13 and 14, high-speed arithmetic processors 8 and 9 for executing a user program, in which vector calculation is mainly performed at very high speed, a control processor 10, a control data transfer control unit 3 for controlling data transfer between the input/output processors 11 and 12 or the control processor 10 and a control memory 1, a high-speed data transfer control unit 7 for controlling data transfer between the high-speed arithmetic processors 8 and 9 and a high-speed arithmetic memory 2, a control unit 5 for controlling data communication between the high-speed arithmetic processor side and the control processor side and data communication between the processors, and a data mover 4 for enabling data transfer between the control memory 1 and the high-speed arithmetic memory 2, which is designated by the control processor 10 or the input/output processors 11 and 12.

In addition, the data mover 4 sequentially transfers data each having a designated total data transfer length from a data buffer 4a in the data mover 4 to the designated start address of the control memory 1 at a transfer rate of the control data transfer control unit 3. This transfer operation is controlled by the data mover 4. The data mover 4 sequentially transfers, at high speed, data having a designated total data transfer length from the data buffer 4a in the data mover 4 to the designated start address of the high-speed arithmetic memory 2 at a data transfer rate of the high-speed data transfer control unit 7.

An operation of this embodiment will be described below.

An operation performed when data must be transferred from the secondary memory device 13 to the high-speed arithmetic memory 2 will be described hereinafter.

The high-speed arithmetic processor 8 stores in the control memory 1 a channel program which includes data required for data transfer, and signals this storage to the control processor 10 through communication between the processors.

The control processor 10 which received data of this storage starts the input/output processor 11. Then, the input/output processor 11 reads out the channel program from the control memory 1, and signals the start of data transfer to the secondary memory device 13. Desired data is read out from the secondary memory device 13, and is stored in the buffer in the control memory 1.

After all the designated data are transferred from the secondary memory device 13 to the control memory 1, the end of the data transfer by the I/O start is signaled from the input/output processor 11 to the control processor 10.

The control processor 10 which received data representing the end of the data transfer reads out the channel program stored in the control memory 1, and produces data for starting the data mover 4.

FIG. 2 shows contents of data for starting the data mover 4. A transfer target designates a data transfer direction between the control memory 1 and the high-speed arithmetic memory 2.

An output format represents that a request source for starting the data mover 4 is the control processor 10 or the input/output processors 11 and 12, and that a transfer scheme is synchronous or asynchronous.

A control memory address represents that a start address or a logical/physical address of the control memory 1 is a target for data transfer.

In this embodiment, the control memory address is defined by 8-byte boundaries.

A high-speed arithmetic memory address represents that a start address or a logical/physical address of the high-speed arithmetic memory is a target for data transfer.

In this embodiment, the high-speed arithmetic memory address is defined by 8-byte boundaries.

The total data transfer length represents a total number of transfer data when each 8-byte transfer data is defined as one element.

In this embodiment, the control processor 10 sequentially designates the above-mentioned data shown in FIG. 2 to the data mover 4. Finally, the data mover 4 is started.

In this embodiment, the started data mover 4 reads out data from the start address of the control in the large-capacity buffer 4a in the data mover 4 memory 1 in accordance with the data shown in FIG. 2.

In this embodiment, the total data transfer length does not exceed the capacity of the large-capacity buffer 4a. If the total data transfer length exceeds the capacity of the buffer 4a, the data mover 4 divides the total data transfer length into some data to control data transfer of the control memory 1 and the high-speed arithmetic memory 2.

Data transfer from the control memory 1 to the large-capacity buffer 4a in the data mover 4 is performed at a data transfer rate of the control data transfer control unit 3.

Then, data transfer is executed from the large-capacity data buffer 4a in the data mover 4 to the high-speed arithmetic memory 2 under the control of the data mover 4. At this time, the transfer operation is controlled in accordance with the data shown in FIG. 2 such as the high-speed arithmetic memory address and the total data transfer length.

In this embodiment, data transfer from the large-capacity buffer 4a in the data mover 4 to the high-speed arithmetic memory 2 is executed at a transfer rate of the high-speed data transfer control unit 4. If a well-balanced ratio can be achieved from a point of view as a system, this transfer rate may be 1/n (n is an integer) the data transfer rate between the high-speed arithmetic processor 8 and the high-speed arithmetic memory 2.

When the data mover 4 completes transfer of all the data according to the above-mentioned procedures, the data representing the end of transfer is supplied from the data mover 4 to the control processor 10 serving as the request source, and the data representing the end of transfer is supplied from the control processor 10 to the high-speed arithmetic processor 8 through communication between the processors. Therefore, the data transfer from the secondary memory device to the high-speed data memory is completed.

Although the high-speed arithmetic processor 8 and the secondary memory device 13 are used in this embodiment, another high-speed arithmetic processor and another secondary memory device can be similarly used.

Figure 3:
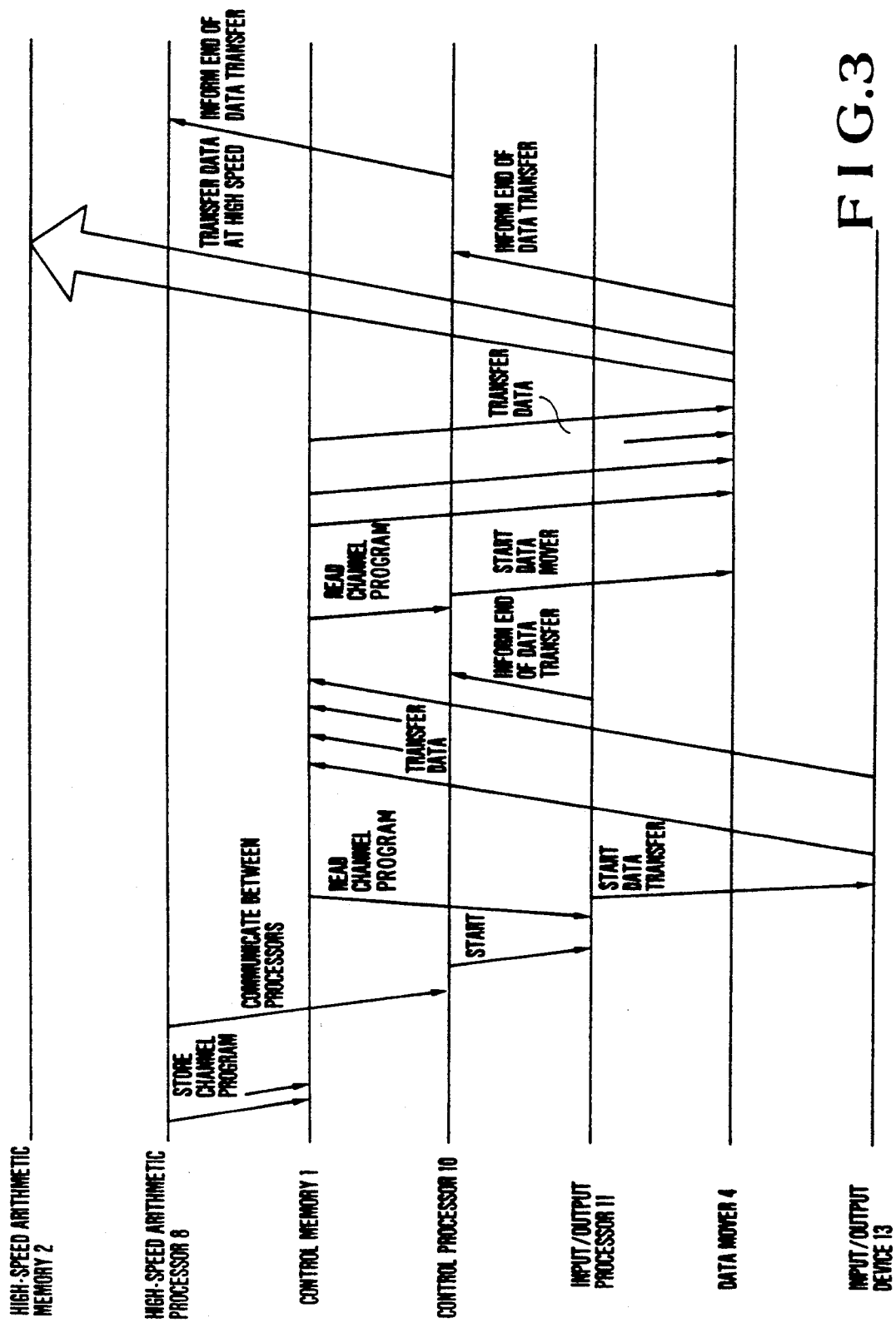
FIG. 3 is a diagram of data transfer from an input-/output device to a high-speed arithmetic memory shown in the first and second embodiments.

FIG. 3 shows a transfer operation from the input/output device to the high-speed arithmetic memory in the first embodiment of the present invention.

Figure 4:
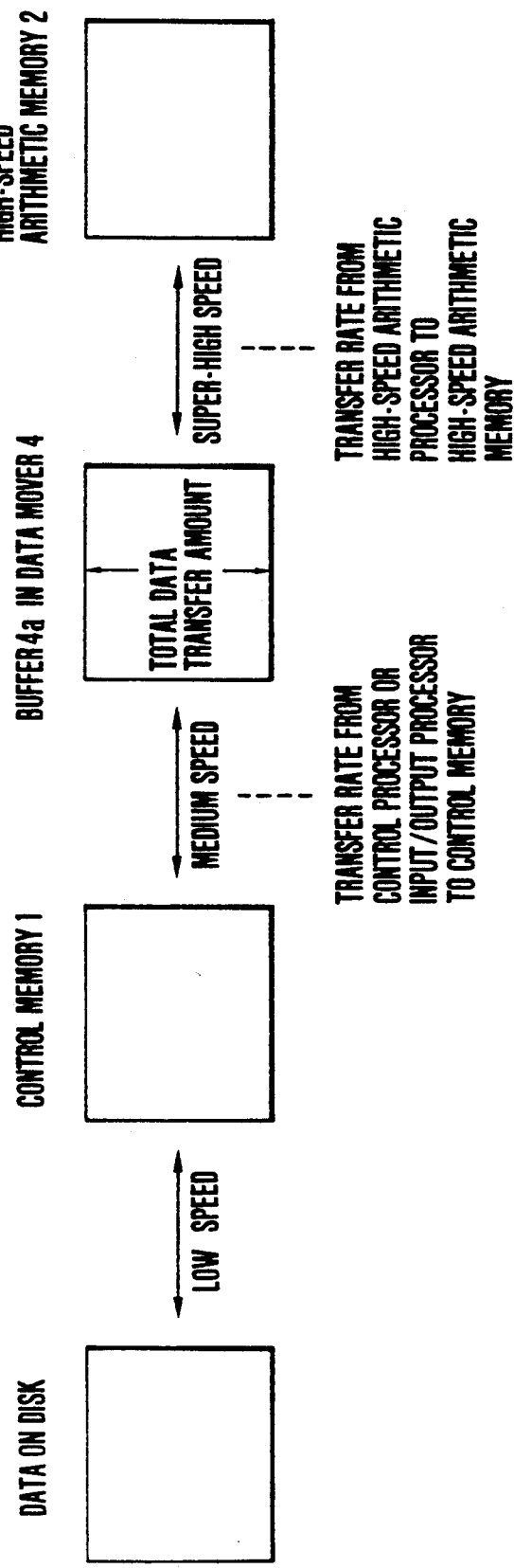
FIG. 4 is a view showing a data transfer image in the first embodiment.

FIG. 4 shows a data transfer image.

Second Embodiment

A second embodiment will be described below with reference to FIG. 1, in the same manner as in the first embodiment.

In the second embodiment, the data mover 4 sequentially transfers data each having a designated total data transfer length from a data buffer 4a in the data mover 4 to the designated start address of the control memory 1 at a transfer rate of the control data transfer control unit 3. This transfer operation is controlled by the data mover 4. The data mover 4 sequentially transfers, at high speed, data having a designated block data transfer length from the data buffer 4a in the data mover 4 to the designated start address of the high-speed arithmetic memory 2 at a data transfer rate of the high-speed data transfer control unit 7, in accordance with a designated interelement distance.

Note that when the interelement distance is "0", data each having a designated total data transfer length are sequentially transferred in the same manner as in the first embodiment.

An operation of this embodiment is the same as that in the first embodiment.

FIG. 5 shows contents of data for starting the data mover 4. A transfer target designates a data transfer direction between the control memory 1 and the high-speed arithmetic memory 2.

An output format represents that a request source for starting the data mover 4 is the control processor 10 or the input/output processors 11 and 12, and that a transfer scheme is synchronous or asynchronous.

A control memory address represents that a start address or a logical/physical address of the control memory 1 is a target for data transfer.

In this embodiment, the control memory address is defined by 4-byte boundaries.

A high-speed arithmetic memory address represents that a start address or a logical/physical address of the high-speed arithmetic memory is a target for data transfer.

In this embodiment, the high-speed arithmetic memory address is defined as 4-byte boundaries.

The total data transfer length represents a total number of transfer data when each 4-byte transfer data is defined as one element.

The interelement distance designates the distance between the block data in units of bytes.

The block data transfer length represents the length of data processed as block data by the number of elements obtained when 4-byte data is defined as one element in this embodiment.

In this embodiment, the control processor 10 sequentially designates the above-mentioned data shown in FIG. 5 to the data mover 4, in the same manner as in the first embodiment. Finally, the data mover 4 is started.

In this embodiment, the started data mover 4 reads out data from the start address of the control memory 1 in the large-capacity buffer 4a in the data mover 4 in accordance with the data shown in FIG. 5.

In this embodiment, the total data transfer length does not exceed the capacity of the large-capacity buffer 4a. If the total data transfer length exceeds the capacity of the buffer 4a, the data mover 4 divides the total data transfer length into some data to control data transfer between the control memory 1 and the high-speed arithmetic memory 2.

Data transfer from the control memory 1 to the large-capacity buffer 4a in the data mover 4 is performed at a data transfer rate of the control data transfer control unit 3.

Figure 6:
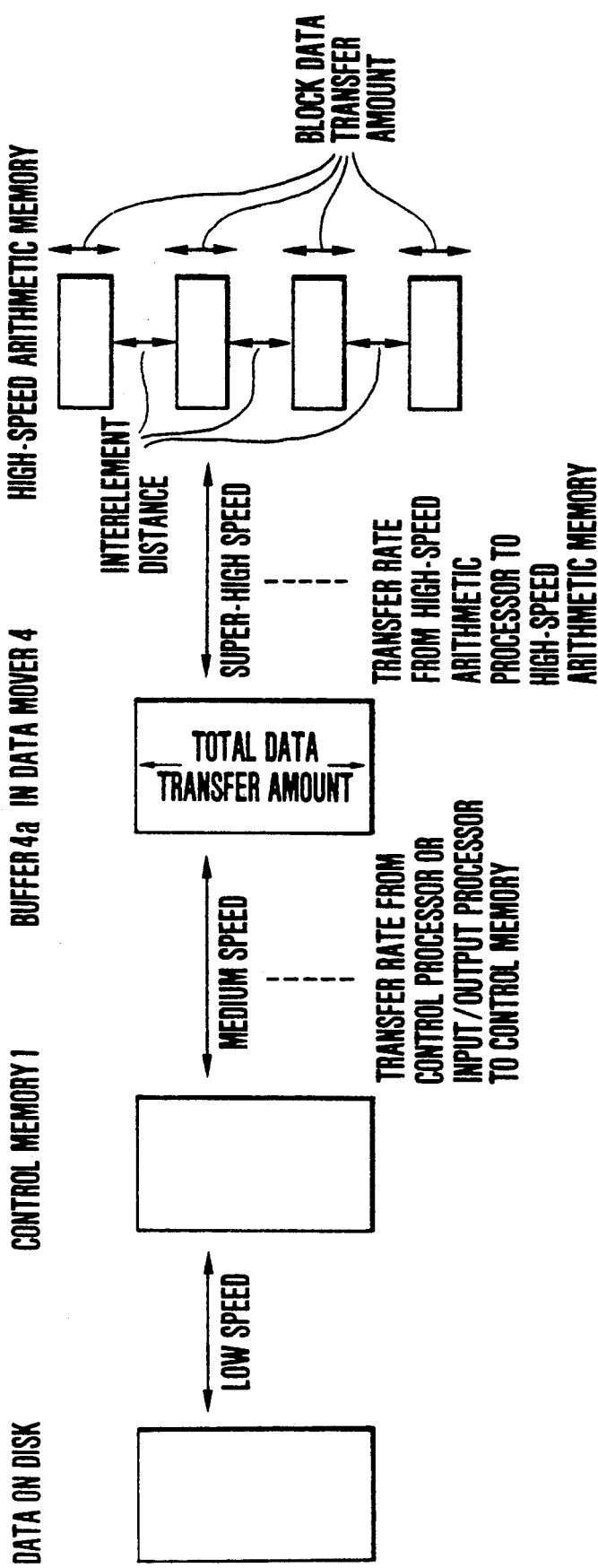
FIG. 6 is a view showing a data transfer image in the second embodiment.

Then, data transfer is executed from the large-capacity data buffer 4a in the data mover 4 to the high-speed arithmetic memory 2 under the control of the data mover 4, as shown in FIG. 6. At this time, the transfer operation is controlled in accordance with the data shown in FIG. 5 such as the high-speed arithmetic memory address, the total data transfer length, the interelement distance, and the block data transfer length.

As described above, in this invention, data transfer between the control memory and the high-speed arithmetic memory designated by the control processor to the data mover is performed as follows. Data having a designated amount is transferred from the large-capacity buffer in the data mover to the designated start address of the control memory at a data transfer rate of the control memory and the control processor. In addition, the data having a designated transfer amount is transferred, at high speed, from the buffer in the data mover to the designated start address of the high-speed arithmetic memory at a data transfer rate between the high-speed arithmetic memory and the high-speed arithmetic processor. Therefore, a ratio of a transfer period of time between the secondary memory device and the high-speed arithmetic memory to that of a transfer period of time between the high-speed arithmetic processor and the high-speed arithmetic memory can be decreased, and an execution period of time of the entire program can be decreased, thus effectively improving the performance.

In addition, according to the present invention, data each having a designated block data transfer length are sequentially transferred from the buffer in the data mover to the designated start address of the high-speed arithmetic memory in accordance with the designated interelement distance. Furthermore, data each having a designated total data length are sequentially transferred, at high speed, from the buffer in the data mover to the designated start address of the high-speed arithmetic memory at a data transfer rate between the high-speed arithmetic memory and the high-speed arithmetic processor. Therefore, a ratio of a transfer period of time between the secondary memory device and the high-speed arithmetic memory to that of a transfer period of time between the arithmetic processor and the high-speed arithmetic memory can be decreased, and the execution period of time of the entire program can be decreased, thus effectively improving the performance. Moreover, data can be optimally developed from the secondary memory device so that a high-speed arithmetic operation can be directly performed in the high-speed arithmetic memory, and the execution period of time for the program can be effectively reduced.

What is claimed is:

1. A data processing apparatus comprising:
   a high speed arithmetic processor;
   a control memory, receiving a channel program from said high speed arithmetic processor and storing said channel program;
   a control processor, receiving a signal from said high speed arithmetic processor indicating that said channel program was sent to said control memory, and outputting a start signal;
   an input/output processor receiving said start signal from said control processor, reading out said channel program from said control memory and outputting a start data transfer signal;
   a memory device receiving said start data transfer signal from said input/output processor and outputting designated data to a first buffer in said control memory at a first transfer rate, wherein when all said designated data are transferred from said memory device to said first buffer, an end of transfer signal is sent from said input/output processor to said control processor, said control processor producing transfer control data from said channel program in response to said end of transfer signal;
   a data mover receiving said transfer control data from said control processor; and
   a second buffer in said data mover receiving said designated data at said first transfer rate from said control memory, under control of said data mover and transferring said received designated data from said second buffer at a second transfer rate, under control of said data mover, higher than said first transfer rate, to a high speed arithmetic memory.

2. A method for transferring data comprising the steps of:
   transferring a channel program to a first memory unit in a first processor group from a processor in a second processor group;
   signalling a control processor in said first processor group that said transferring step has occurred;
   reading said channel program stored in said first memory unit by another processor in said first processor group in response to said signalling of transferring;
   transferring designated data, in response to said reading of said channel program, from a secondary memory device in said first processor group to said first memory unit in said first processor group;
   signalling said control processor that said transferring designated data step is complete;
   reading said channel program stored in said first memory unit by said control processor in response to said signalling step of complete transferring; and
   signalling a data mover to begin transferring data from said first memory unit of said first processor group to a second memory unit of said second processor group, in response to said reading by said control processor, wherein said designated data in said first memory unit of said first processor group is transferred at a first predetermined rate equal to a first rate of data transfer between said first processor group and said first memory unit in said first processor group to a buffer in said data mover, and said designated data is transferred from said buffer to said second memory unit of said second processor group at a second predetermined rate equal to a second rate of data transfer between said second processor group and said second memory unit in said second processor group.

3. The data processing apparatus as recited in claim 1, wherein said first transfer rate is equal to the rate of data transfer between said control processor and said control memory, and said second transfer rate is equal to the rate of data transfer between said high speed arithmetic processor and said high speed arithmetic memory.

* * * * *